United States Patent [19]

Sloan et al.

[11] Patent Number: 5,708,777

[45] Date of Patent: Jan. 13, 1998

[54] METHOD AND APPARATUS FOR SELECTIVELY LOCKING A SYSTEM PASSWORD OF A COMPUTER SYSTEM

[75] Inventors: Jeffrey N. Sloan, Round Rock; Peter Woytovech, Austin, both of Tex.

[73] Assignee: Dell USA, LP, Austin, Tex.

[21] Appl. No.: 543,469

[22] Filed: Oct. 16, 1995

[51] Int. Cl.$^6$ .................................................. G06F 12/14
[52] U.S. Cl. ............... 395/188.01; 395/726; 395/187.01; 395/186; 395/491
[58] Field of Search ............................. 395/726, 188.01, 395/186, 491, 187.01; 380/23, 25

[56] References Cited

U.S. PATENT DOCUMENTS

| | | | |
|---|---|---|---|
| 5,375,243 | 12/1994 | Parzych et al. | 395/188.01 |
| 5,402,492 | 3/1995 | Goodman et al. | 380/25 |
| 5,537,544 | 7/1996 | Morisawa et al. | 395/188.01 |
| 5,574,786 | 11/1996 | Dayan et al. | 380/25 |

*Primary Examiner*—Jack B. Harvey
*Assistant Examiner*—Ario Etienne
*Attorney, Agent, or Firm*—Arnold, White & Durkee

[57] ABSTRACT

A method and apparatus for selectively locking and unlocking the system password of a PC in response to authorized requests by the system administrator. The method and apparatus operate in a PC environment having a Setup utility program and the capability for a system password to control access. The disclosed method contemplates receiving a user request to either disable or change the system password. If the request is a request to disable the system password, then the system password status is examined. If the system password status is "locked," then the system password is not disabled. If the system password status is "unlocked," then the system password is disabled. If, on the other hand, the user request is a request to change the system password, then the setup password is examined. If the setup password is disabled, then the user is permitted to change the system password. If the setup password is enabled, then the user must correctly enter the setup password before being permitted to change the system password.

6 Claims, 7 Drawing Sheets

Phoenix ROM BIOS PLUS Version 1.10 j60
Copyright 1985-1988 Phoenix Technologies Ltd.
Copyright 1990-1995 Dell Computer Corporation
All Rights Reserved Phoenix S3 Vision864 (16Bit DAC) Enhanced VGA Bios. Version 1.03-02
Copyright 1987-1994 Phoenix Technologies Ltd.

Dell System OptiPlex XMT 590

Type the password and ...
-- press <ENTER> to leave password security enabled.
-- press <CTRL><ENTER> to disable password security.
Enter password:
Password correct.
Password-locked, -not disabled.

FIG. 2

Dell Computer Corporation
System OptiPlex XMT 590 Setup     BIOS Version: j60

Page 2 of 2

| | | |
|---|---|---|
| Keyboard Errors: | Report Enabled —410 | This category locks the system password setup line item if the setup password is enabled. |
| System Password: | Enabled —410 | |
| Password Status: | Unlocked —420 | |
| Boot Sequence: | Diskette First | To stop the system password from being modified, set this option to locked and enable setup password. |
| Setup Password: | Enabled —430 | |
| Auto Power On: | Disabled  00:00 | This category also locks the system password from being disabled at boot time via <ctrl> <enter> keys |
| Power Management: | Disabled | |

——Integrated Devices——

| | |
|---|---|
| Mouse: | On |
| Serial Port 1: | Auto |
| Serial Port 2: | Auto |
| Parallel Port: | 378h |
| Parallel Mode; | PS/2 |
| Hard Disk: | Auto |
| Diskette: | Auto |
| Speaker: | On |

| | |
|---|---|
| Microprocessor: | Pentium - 90 |
| External Cache: | 256 KB |
| Video Memory: | 2 MB |
| System Memory: | 16384 KB |
| Service Tag: | 4FN82 |

Tab, Shift-Tab change fields | ↠ change values  Alt-P next | Esc exit | Alt-B reboot

FIG. 4

Dell Computer Corporati
System OptiPlex XMT 590 Setup       BIOS Version: j60

Page 2 of 2

| | | |
|---|---|---|
| Keyboard Errors: | Report | |
| System Password: | Enabled — 510 | To disable the System Password, simultaneously press the <Ctrl> and <Enter> keys after typing in the password. |
| Password Status: | Unlocked — 520 | |
| Boot Sequence: | Diskette First | |
| Enter Password: | [       ] — 530 | |
| | | To change the System password, disable the password and then enter a new password. |
| Auto Power On: | Disabled  00:00 | |
| Power Management: | Disabled | |
| | | To disable the Setup Password, press the left- or right-arrow keys while in System Setup. |

───── Integrated Devices ─────

| | |
|---|---|
| Mouse: | On |
| Serial Port 1: | Auto |
| Serial Port 2: | Auto |
| Parallel Port: | 378h |
| Parallel Mode; | PS/2 |
| Hard Disk: | Auto |
| Diskette: | Auto |
| Speaker: | On |

| | |
|---|---|
| Microprocessor: | Pentium - 90 |
| External Cache: | 256 KB |
| Video Memory: | 2 MB |
| System Memory: | 16384 KB |
| Service Tag: | 4FN82 |

Tab, Shift-Tab change fields | → change fields | ↑↓ change values | Alt-P next | Esc exit | Alt-B reboot

FIG. 5

Dell Computer Corporation
System OptiPlex XMT 590 Setup     BIOS Version: j60

Page 2 of 2

Keyboard Errors:        Report
System Password:        Enabled
Password Status:        Unlocked
Boot Sequence:          Diskette First
Setup Password:         Enabled Auto Power On:          Disabled  00:00
Power Management:       Disabled ———Integrated Devices———
Mouse:                  On
Serial Port 1:          Auto
Serial Port 2:          Auto
Parallel Port:          378h
Parallel Mode:          PS/2
Hard Disk:              Auto
Diskette:               Auto
Speaker:                On This category locks the system password setup line item if the setup password is enabled.

To stop the system password from being modified, set this option to locked and enable setup password.

This category also locks the system password from being disabled at boot time via <ctrl> <enter> keys Microprocessor:         Pentium - 90
External Cache:         256 KB
Video Memory:           2 MB
System Memory:          16384 KB
Service Tag:            4FN82

610

Tab, Shift-Tab change fields | → change values | Alt-P next | Esc exit | Alt-B reboot

FIG. 6

METHOD AND APPARATUS FOR SELECTIVELY LOCKING A SYSTEM PASSWORD OF A COMPUTER SYSTEM

BACKGROUND OF THE INVENTION

This invention relates to a method and apparatus for selectively locking a system password of a computer system.

The invention advantageously permits system administrators to selectively "lock" a personal computer (PC) via the system setup utility program ("Setup"). Setup is a system-resident software routine that allows users to view and change a variety of computer system characteristics, including the availability of serial and parallel ports, the status of internal speakers, the status of power management software, and the availability and status of system passwords. A system password, when enabled, provides controlled access to a PC. When a system password is enabled on a PC, the user is prompted to enter the system password during system initiation ("boot"). If the user is unable to enter the correct password, access to the PC is denied to the user. If the user enters the correct password, the PC completes booting and provides the user with access to general PC functions and resources.

The present invention addresses a need in various user environments for making system passwords, when the invention is enabled, unavailable for users to change or set. In a university computer lab, for example, system administrators desire the ability to maintain control over the accessibility of the personal computers in the lab. Once a student is using a PC, however, she or he could initiate the Setup program and enable or alter the system password without the system administrator's knowledge or consent. Any subsequent users—including the system administrator—would then be unable to utilize the PC because they would not know the correct system password when prompted during system boot. In order to restore access to the PC, the system administrator has to physically access the machine, and may have to remove the cover from the PC, unplug the battery supplying power to CMOS memory where the system password was stored, and wait until the battery power diminishes sufficiently to reset the CMOS memory storing the system password.

Prior to the present invention, the system administrator had no ability to "lock" the system password so that it could not be disabled or altered once the system password was properly entered. Management of the system password was provided through the Setup program. Denying users access to the Setup program was an undesirable solution because users legitimately need to access the other features, system information, and resource management functions provided by Setup.

In many environments, PCs are often shared among a number of users. System administrators could benefit greatly from the ability to set and lock system passwords for the PCs under their management. Given the ability to lock system passwords, system administrators could effectively control access to PCs without having to worry about unwanted tampering with the system passwords by users.

Therefore, what is needed is a software-based method and apparatus for selectively locking the system password of a computer system to avoid the problem of users enabling or altering system passwords without the system administrator's knowledge or consent.

SUMMARY OF THE INVENTION

The present invention solves the above-noted problems by providing a method and apparatus for selectively locking and unlocking the system password in response to authorized requests by the system administrator.

In particular, the method of the present invention contemplates receiving a user request to either disable or change the system password; determining whether the request is a request to disable the system password or a request to change the system password; if the request is to disable the system password, then disable the system password only if the password status associated with the system password is "unlocked"; if the request is to change the system password, then permit the change only if the setup password (also known as "administrator password") is disabled or if the setup password is enabled and the user correctly entered the correct enabled setup password.

This method contemplates two types of system password-related change requests by the user: a request to disable the system password altogether, and a request to enable the system password.

Also contemplated as part of the present invention is a program storage device, for example, a BIOS memory, tangibly embodying a set of instructions that, when loaded into a PC, will cause the PC to perform the above-described method. The invention also encompasses a programmed PC that will perform the method steps described above.

These and other features and advantages of the present invention will become apparent to those of ordinary skill in this art with reference to the appended drawings and following detailed description.

BRIEF DESCRIPTION OF THE DRAWINGS

FIG. 2 is an example of a screen display encountered by users during system boot when the user correctly enters the system password on a PC that has a system password enabled and locked according to the present invention.

FIG. 4 is an example of a Setup program screen display including a "Password Status" field which is associated with the system password according to the present invention.

FIG. 5 is an example of a Setup program screen display with the Password Status field "Locked" and the System Password field enabled.

FIG. 6 is an example of a Setup program screen display with the Help information for the Password Status field also displayed.

DETAILED DESCRIPTION

One implementation of the invention is described here for purposes of illustration, namely a machine-executed method of selectively locking and unlocking the system password in response to authorized requests by a user.

Figure 1:
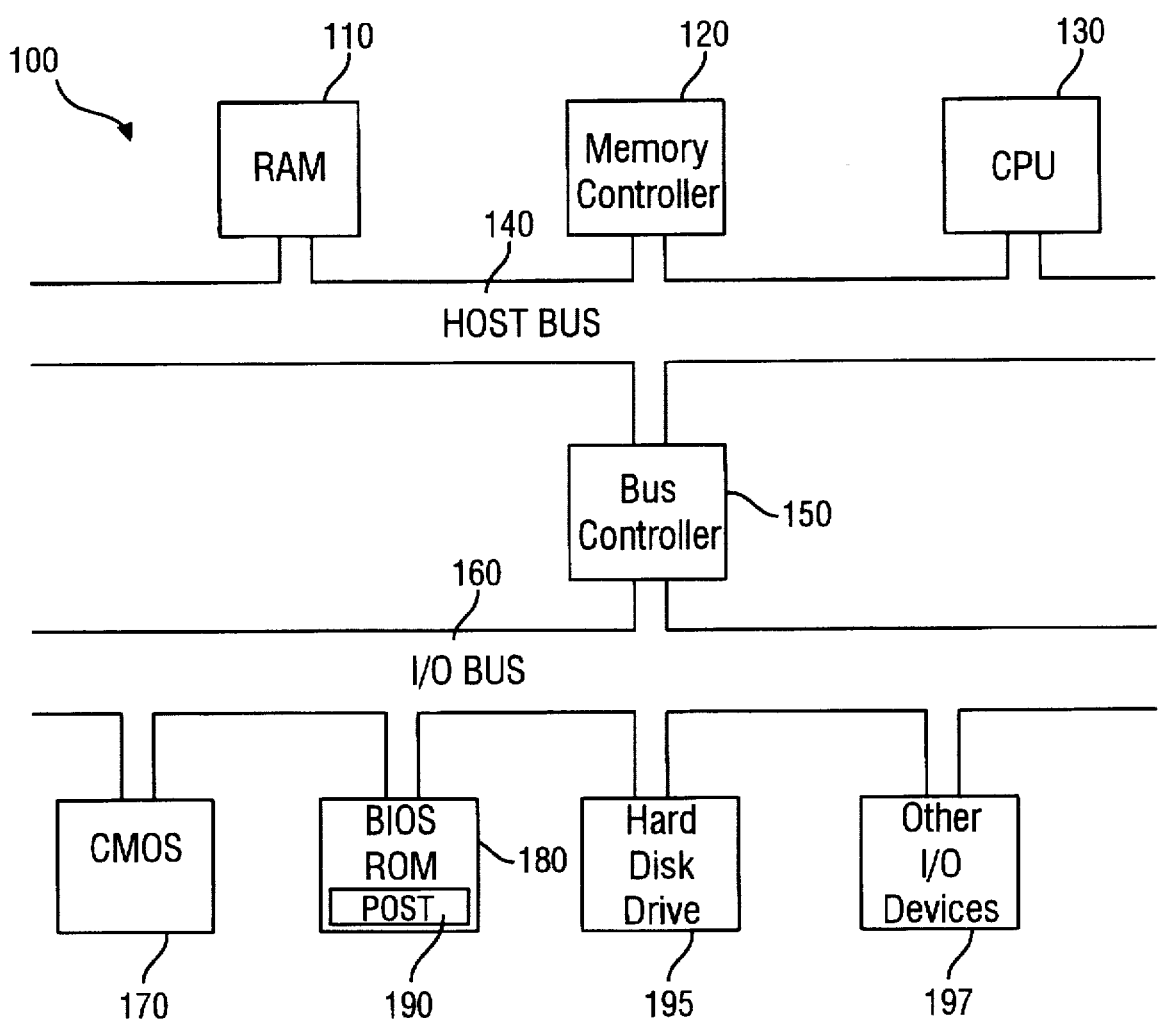
FIG. 1 is a system block diagram of a personal computer system for implementing the method of the present invention.

FIG. 1 is a system block diagram of a PC 100 in which the method of the present invention may be implemented.

In the disclosed exemplary embodiment, PC 100 comprises a CPU 130 connected to system RAM 110 via a memory controller 120 and host bus 140. CPU 130 is further connected to other hardware devices via host bus 140, bus controller 150, and I/O bus 160. These other hardware devices include, for example, hard disk drive 195, Basic Input/Output System (BIOS) Read-Only Memory (ROM) 180 in which a Power On Self Test (POST) program 190 is stored, a nonvolatile storage device, such as CMOS 170, as well as other I/O devices, including, for example, a keyboard, display, mouse, joystick, or the like, all of which are collectively designated by reference numeral 197.

The machine-executed method of the present invention is invoked at the user's request and is performed by executable computer software contained in BIOS ROM or flash memory 180. BIOS is the firmware in a PC that interfaces directly with the hardware to perform input/output and other low-level functions. An actual implementation of such computer code might be executable on a Dell PC based on the Intel 80×86 or Pentium™ microprocessors, or on other suitable processor-based computer systems.

(It will be appreciated by those of ordinary skill, of course, that references to the performance of method steps by computer software actually mean that a computer, or one of its components, is performing the method steps in response to the instructions encoded in the computer software.)

In the interest of clarity, not all features of an actual implementation are described in this specification. It will, of course, be appreciated that in the development of any such actual implementation (as in any hardware or software development project), numerous design and programming decisions must be made to achieve the developers' specific goals and subgoals (e.g., compliance with system-related and business-related constraints), which will vary from one implementation to another. Moreover, attention will necessarily be paid to, e.g., proper serialization to handle concurrent events. It will be appreciated that a development effort of this type might be involved, but would nevertheless be a routine undertaking of computer system design and development for those of ordinary skill having the benefit of this disclosure.

The method of the present invention allows a user, most likely the system administrator, to selectively "lock" a PC's system password via the Setup program. A system password, when enabled, provides controlled access to a PC. When a system password is enabled on a PC, the user is prompted to enter the system password during system boot. If the user is unable to enter the correct system password, access to the PC is denied to the user. If the user enters the correct system password, the PC completes booting and provides the user with access to general PC functions and resources.

The present invention contemplates a status field (called a "Password Status" field) associated with the system password that reflects one of two conditions: locked or unlocked. This Password Status field can be changed only by a user correctly entering a separate setup password. The setup password controls access to one or more higher-level, administrative functions that are typically not available to the general user. According to the present invention, one of these higher-level functions is the ability to toggle the system password status field between the locked and unlocked conditions. Once the setup password is enabled and properly entered by the authorized user, the authorized user can lock the system password to prevent subsequent users from being able to disable or change the system password.

FIG. 2 depicts an example of the screen display encountered by users during system boot when the user correctly enters the system password on a PC that has a system password enabled and locked. In this example, the user has entered the correct system password and requested that the system password be disabled (by pressing <CTRL><ENTER>). Because the system password is locked according to the present invention, system boot completes and the system password remains enabled. The user is informed "Password locked, not disabled."

Figure 3:
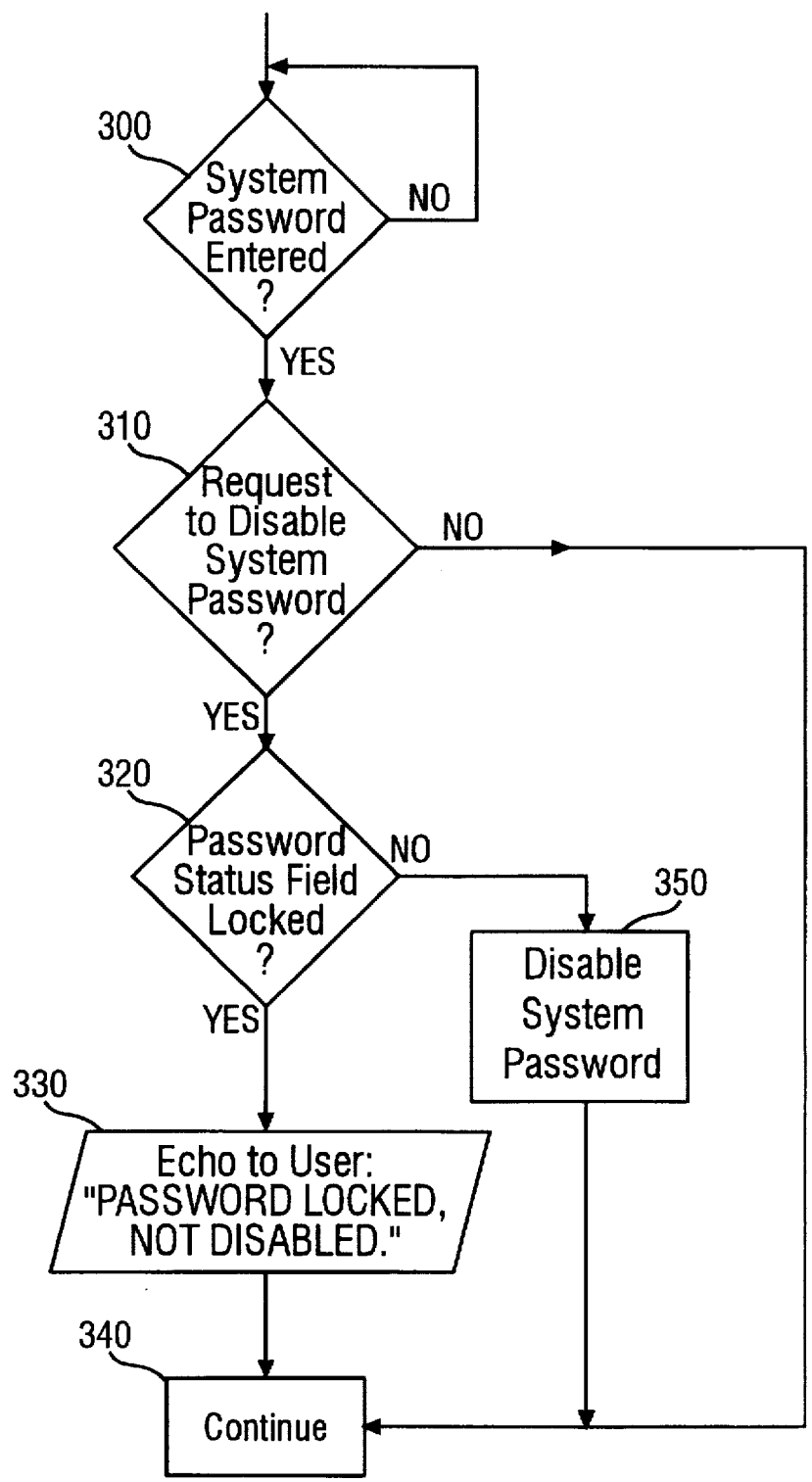
FIG. 3 is a flow chart of specific steps performed in the method of the present invention.

Depicted now in FIG. 3 is a flow chart of specific steps performed in the method of the present invention. After a PC has been powered on or re-booted by a user, the PC undergoes certain system initiation functions common in the industry. If a system password has been enabled, during this boot process the user is prompted to enter the system password, as in step 300.

If the user does not enter the correct system password, control is typically returned to step 300 where the user is again prompted to enter the correct password. Optionally, after several unsuccessful attempts to receive the correct system password, the boot process may stop prompting the user for the system password and halt the boot process. In this optional scenario, the user would be required to re-boot the system to have an additional opportunity to provide the correct system password.

Step 310: If the correct system password is entered, a determination is made whether the user has requested disablement of the system password. The request to disable a system password could be implemented by requiring the user to provide the keyboard sequence <CTRL><ENTER> following entry of the system password. If no request to disable the system password is detected, control passes to step 340 where system boot processing continues.

Step 320: Upon detecting a request to disable the system password, the system password status field associated with the system password is examined. If the system password status field is found to be in the "locked" condition, then control passes to step 330 where an appropriate descriptive message is optionally provided to the user, such as "Password Locked. System Password Not Disabled." Control then passes to step 340 where system boot processing continues.

At step 350, a determination has been made that the system password status field is in the "unlocked" condition. In this condition, the system password is disabled. Subsequent to system password disablement, the user will not be prompted for the system password during system boot. Instead, system boot will continue unabated and, if other problems are not encountered, the PC and all of its customary resources will be made available to the user.

FIG. 4 depicts the Setup program screen including a "Password Status" field 420 which is associated with the system password. When this Password Status field 420 is "Unlocked" and the System Password field 410 is enabled, as is depicted in FIG. 4, the user will be prompted to enter the system password during boot. Because the Password Status field 420 is "Unlocked," the user can change or disable the system password at will. Also depicted is the Setup Password field 430, indicating that a setup password has been enabled.

FIG. 5 depicts the Setup program screen with the Password Status field 520 "Locked" and the System Password field 510 enabled. Under these settings, the user cannot change the status of the System Password field 510 without entering the correct setup password. Also depicted is the Enter Password field 530, providing the user with the opportunity to enter a setup password in order to obtain access to all functions restricted to users having the setup password.

FIG. 6 depicts the Setup program screen displaying the Help information 610 for the Password Status field. This Help information 610 is displayed when the user highlights the Password Status field with the cursor.

Figure 7:
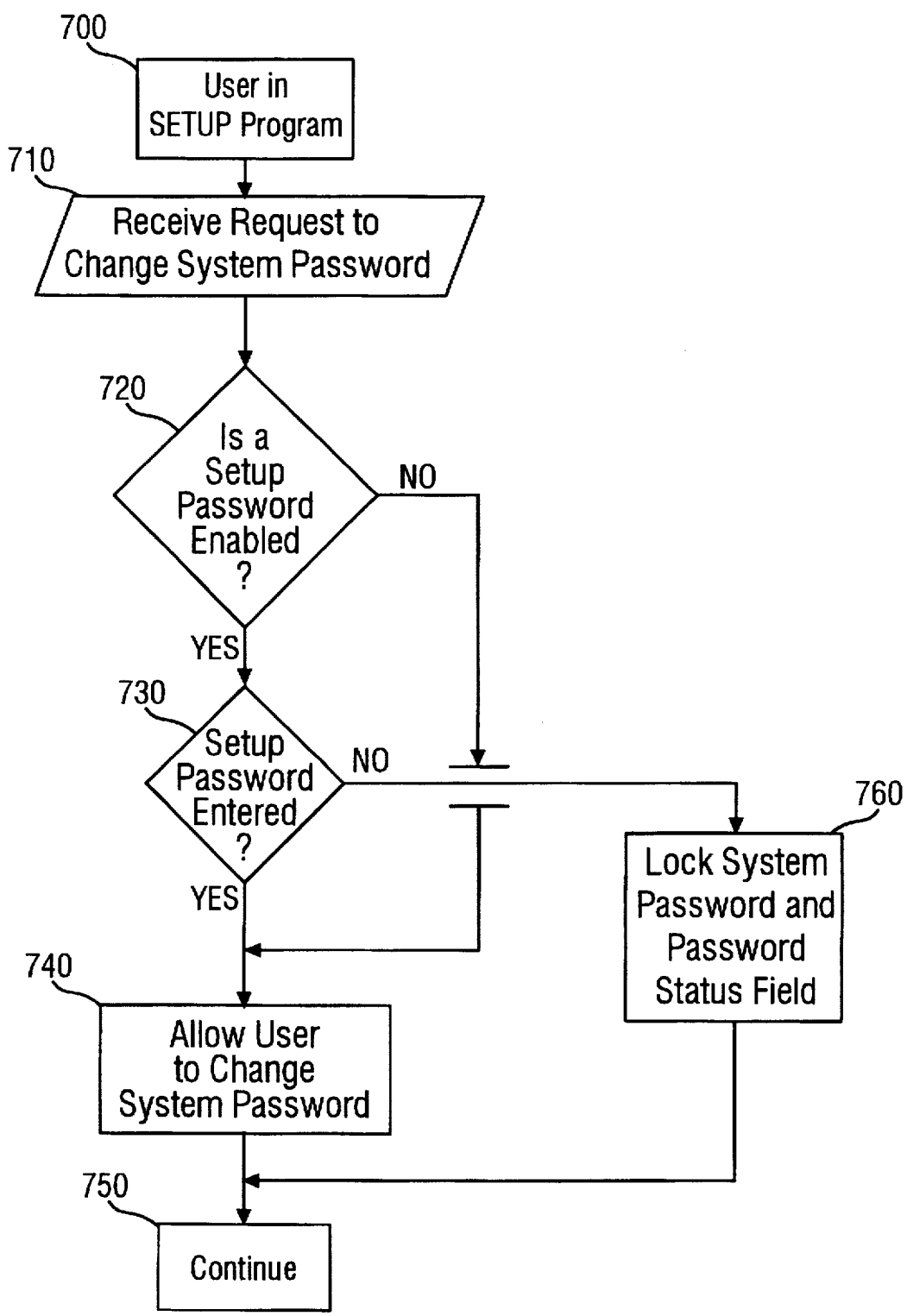
FIG. 7 is a flow chart of specific steps performed in the method of the present invention.

Referring now to FIG. 7, at step 700 the user has already entered the Setup program which allows users to view and change a variety of computer system characteristics, including the availability of serial and parallel ports, the status of internal speakers, the status of power management software, and the availability and status of system passwords.

At step 710, the user has made a request to change the system password.

Step 720: A determination is made whether a setup password has been enabled. If a setup password has been enabled, then control is passed to step 730 where the setup password is checked. If, on the other hand, no setup password has been enabled, then control passes to step 740 where the user is permitted to change the system password.

Step 730: A determination is made whether the setup password was correctly entered. If the setup password was correctly entered, control passes to step 740 where the user is permitted to change the system password. If, on the other hand, the setup password was not entered correctly, control passes to step 760, where the system password status field remains locked, the user is not permitted to change the system password, and control passes to step 750 where Setup program processing continues.

Step 740: If no setup password was enabled, or if the setup password was both enabled and entered correctly by the user, the user is permitted to change the system password.

Step 750: Setup program processing continues.

Those of ordinary skill in the art will recognize that there are many alternative implementations to control access to a computer system. The use of a system password status field associated with the system password is just one specific implementation of controlling access. Therefore, it will be appreciated by those of ordinary skill, having the benefit of this disclosure, that numerous variations from the foregoing illustration will be possible without departing from the inventive concept described therein. Accordingly, it is the claims set forth below, and not merely the foregoing illustrations, which are intended to define the exclusive rights claimed in this application.

What is claimed is:

1. A machine-executed method for selectively permitting a personal computer user to change or disable access to a personal computer system, access to one or more general functions of said personal computer system being controlled by a system password if said system password is enabled, said system password associated with a system password status capable of reflecting the status of being "locked" or "unlocked," and access to one or more administrative functions of said personal computer system being controlled by a setup password if said setup password is enabled, said system password, if enabled, required to be entered by said user during initiation of said computer system as a condition to allowing said user to utilize said one or more general functions of said computer system, and said setup password, if enabled, required to be entered by said user during execution of a setup program as a condition to allowing said user to utilize said one or more administrative functions of said computer system, comprising:

(a) receiving a request from said user to change or disable access to said personal computer system;

(b) determining whether said request is a request to disable said system password or a request to change said system password;

(c) if said request is a request to disable said system password, then performing the steps of:

(i) if said system password status is "locked," ignoring said request of said user to disable said system password; and (ii) if said password status is "unlocked," disabling said system password; and (d) if said request is a request to change said system password, then performing the following steps:

(i) if said setup password is disabled, then permitting said user to change said system password; and (ii) if said setup password is enabled, then performing the following steps:

(1) if said user correctly entered said setup password, then permitting said user to change said system password; and (2) if said user incorrectly entered said setup password, then prohibiting said user from changing said system password.

2. A machine-executed method for securing a personal computer system, said computer system undergoing an initiation process whenever said computer system is powered on from a powered off state or re-initiated from a powered on state, comprising:

(a) storing within said computer system a system password for controlling access to said computer system, said system password capable of being selectively enabled and disabled by a user;

(b) storing within said computer system a setup password for controlling access to administrator functions of said computer system, said setup password capable of being selectively enabled and disabled by a system administrator;

(c) storing within said computer system a system password status associated with said system password, said system password status being in either a "locked" or "unlocked" state;

(d) during said initiation process, receiving a request from said user of said personal computer system to disable said system password;

(e) if said system password status is in the "locked" state, then ignoring said request of said user to disable said system password;

(f) if said system password status is in the "unlocked" state, then disabling said system password; and (g) completing said initiation process.

3. A machine-executed method for securing a personal computer system, said computer system having an executable setup utility program that is executed upon request of a user, comprising:

(a) storing within said computer system a system password for controlling access to said computer system, said system password capable of being selectively enabled and disabled by a user;

(b) storing within said computer system a setup password for controlling access to administrator functions of said computer system, said setup password capable of being selectively enabled and disabled by a system administrator;

(c) storing within said computer system a system password status associated with said system password, said system password status being in either a "locked" or "unlocked" state;

(d) during said execution of said setup program utility, receiving a request from said user of said personal computer system to change said system password;

(e) if said setup password is disabled, then permitting said user to change said system password;

(f) if said setup password is enabled, then performing the following steps:
   (1) if said user correctly entered said setup password, then permitting said user to change said system password; and
   (2) if said user incorrectly entered said setup password, then prohibiting said user from changing said system password; and
(g) continuing with execution of said setup program utility.

4. A program storage device readable by the machine of a specified one of claims 1–3 and encoding a program of instructions for performing the operations recited in said specified claim.

5. A machine-executed method for selectively permitting a personal computer user to change or disable access to a personal computer system, access to one or more general functions of said personal computer system being controlled by a system password if said system password is enabled, and access to one or more administrative functions of said personal computer system being controlled by a setup password is said setup password is enabled, said system password, if enabled, required to be entered by said user during initiation of said computer system as a condition to allowing said user to utilize said one or more general functions of said computer system, and said setup password, if enabled, required to be entered by said user during execution of a setup program as a condition to allowing said user to utilize said one or more administrative functions of said computer system, comprising:
   (a) storing within said computer system a system password status associated with said system password, said system password status being in either a "locked" or "unlocked" state;
   (b) receiving a request from said user to change or disable access to said personal computer system;
   (c) determining whether said request is a request to disable said system password or a request to change said system password;
   (d) if said request is a request to disable said system password, then disabling said system password only if said system password status is "unlocked"; and
   (e) if said request is a request to change said system password, then permitting said user to change said system password if said setup password is disabled, or if said setup password is enabled and said user correctly entered said setup password.

6. An apparatus for securing a personal computer system, said personal computer system having a system password for controlling access to one or more general functions of said personal computer system, and a setup password for controlling access to one or more administrator functions of said personal computer system, comprising:
   (a) means for detecting a user request to disable or change said system password;
   (b) means for determining whether said user request to disable or change said system password is permitted, wherein said means for determining comprises:
      (i) means for storing a system password status in a memory device associated with said personal computer system, said system password status being associated with said system password, and said system password status being in either a "locked" or "unlocked" state;
      (ii) means for determining whether said system password status is "locked" or "unlocked"; and
      (iii) means for indicating that said user request to disable or change said system password is permitted, if said system password status is "locked"; and
   (c) means for permitting said user request to disable or change said system password, if said user request to disable or change said system password is permitted.

* * * * *